(12) United States Patent
Sun et al.

(10) Patent No.: US 12,402,151 B2
(45) Date of Patent: Aug. 26, 2025

(54) METHODS FOR NON-PMI CSI REPORTING ENHANCEMENTS FOR MULTI-TRP OPERATION

(71) Applicant: Apple Inc., Cupertino, CA (US)

(72) Inventors: Haitong Sun, Cupertino, CA (US); Chunxuan Ye, San Diego, CA (US); Dawei Zhang, Saratoga, CA (US); Huaning Niu, San Jose, CA (US); Seyed Ali Akbar Fakoorian, San Diego, CA (US); Wei Zeng, San Diego, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 330 days.

(21) Appl. No.: 17/909,312

(22) PCT Filed: Sep. 24, 2021

(86) PCT No.: PCT/CN2021/120188
§ 371 (c)(1),
(2) Date: Sep. 2, 2022

(87) PCT Pub. No.: WO2023/044720
PCT Pub. Date: Mar. 30, 2023

(65) Prior Publication Data
US 2023/0276475 A1    Aug. 31, 2023

(51) Int. Cl.
*H04W 72/04* (2023.01)
*H04L 5/00* (2006.01)
(Continued)

(52) U.S. Cl.
CPC ........... *H04W 72/51* (2023.01); *H04L 5/0048* (2013.01); *H04W 24/10* (2013.01)

(58) Field of Classification Search
CPC ...... H04W 72/51; H04W 24/10; H04L 5/0048
See application file for complete search history.

(56) References Cited

U.S. PATENT DOCUMENTS

| | | | |
|---|---|---|---|
| 11,894,925 B2 * | 2/2024 | Na | H04L 5/0064 |
| 2018/0175983 A1 * | 6/2018 | Yum | H04L 5/0057 |

(Continued)

FOREIGN PATENT DOCUMENTS

| | | |
|---|---|---|
| CN | 112703760 | 4/2021 |
| WO | 2021093194 | 5/2021 |
| WO | 2021159504 | 8/2021 |

OTHER PUBLICATIONS

3GPP TSG RAN WG1 #105-E R1-2104296 Interdigital May 27, 2021.*

(Continued)

*Primary Examiner* — Sai Aung
(74) *Attorney, Agent, or Firm* — Kowert, Hood, Munyon, Rankin & Goetzel, P.C.

(57) ABSTRACT

Apparatuses, systems, and methods for enhancing non-PMI based CSI reporting for NC-JT in multi-TRP operations, including addressing channel CRI reporting, CQI reporting, RI reporting, and CSI processing complexity and timeline in NC-JT multi-TRP operations. For example, a UE may receive, from a base station, a configuration for a first set of CSI-RS resources for a first TRP (associated with single TRP operation), a second set of CSI-RS resources for a second TRP (associated with single TRP operation), and a third set of pairs of CSI-RS resources for the first TRP and second TRP (associated with multi-TRP operation). The UE may report, to the base station, a CRI report indicating whether the UE prefers single TRP operation from the first TRP or the second TRP, or multi-TRP operation from the first TRP and the second TRP. The CRI report may be based on the configuration.

20 Claims, 6 Drawing Sheets

(51) Int. Cl.
*H04W 24/10* (2009.01)
*H04W 72/12* (2023.01)
*H04W 72/51* (2023.01)

(56) References Cited

U.S. PATENT DOCUMENTS

| | | | | |
|---|---|---|---|---|
| 2018/0241532 | A1* | 8/2018 | Kakishima | H04B 7/0626 |
| 2019/0036579 | A1* | 1/2019 | Wei | H04B 7/0645 |
| 2019/0053089 | A1* | 2/2019 | Kwak | H04W 72/23 |
| 2019/0288812 | A1* | 9/2019 | Chen | H04L 1/0027 |
| 2019/0379483 | A1* | 12/2019 | Tang | H04B 7/0456 |
| 2020/0304192 | A1* | 9/2020 | Yum | H04L 1/0013 |
| 2021/0258060 | A1* | 8/2021 | Gao | H04B 7/0632 |
| 2023/0064881 | A1* | 3/2023 | Liu | H04L 5/001 |
| 2023/0093589 | A1* | 3/2023 | Wu | H04B 7/022 375/267 |

OTHER PUBLICATIONS

3GPP TS 38.214 V16.6.0 (Jun. 2021).*
Extended European Search Report for European Patent Application No. 22197552.7; Jan. 26, 2023.
Ericsson "CSI enhancements for Multi-TRP and FR1 FDD reciprocity", 3GPP TSG-RAN WG1 Meeting #106-e R1-2108071, Aug. 16, 2021.
"3rd Generation Partnership Project; Technical Specification Group Radio Access Network; NR; Physical layer procedures for data (Release 16)", 38214-G70, 3rd Generation Partnership Project (3GPP), Mobile Competence Centre; 650, Route Des Lucioles; F-06921 Sophia-Antipolis Cedex; France , Sep. 23, 2021.
Office Action for Japanese Pat. Application No. 2022-557100; Jan. 18, 2024.
Huawei "Summary of CSI enhancements for MTRP and FDD (Round 3)"; 3GPP TSG RAN WG1 Meeting #106-e R1-2108358; Aug. 16, 2021.
Office Action for Japanese Pat. Application No. 2022-557100; Nov. 1, 2023.
Catt "Discussion on CSI enhancements for Rel-17"; 3GPP TSG RAN WG1 Meeting #106-3 R1-2106941; Aug. 16, 2021.
Ericsson Link-levl results on the codeword-to-layer mapping for single-PDCCH NC-JT R1-1905164; Apr. 8, 2019.
NTT Docomo Inc "Summary on [104b-e-NR-UEFeature-Others-01]"; 3GPP TSG RAN WG1 #104bis-3 R1-2103813; Apr. 12, 2021.
Nokia "Introduction of NR enhanced Mimo"; 3GPP TSG-RAN WG1 Meeting #99 R1-1913655; Nov. 18, 2019.
Nokia et al. "Enhancement on CSI measurement and reporting"; 3GPP TSG RAN WG1 Meeting #106-e R1-2108058; Aug. 16, 2021.
Zte "CSI enhancements for Multi-TRP and FR1 FDD reciprocity"; 3GPP TSG RAN WG1 #104-e R1-2100291; Jan. 25, 2021.
International Search Report and Written Opinion for PCT/CN2021/120188; 9 pages; Mar. 30, 2022.
Interdigital, Inc. "Views on CSI Enhancements for NCJT MTRP"; 3GPP TSG RAN WG1 #105-e R1-2104296; 6 pages; May 27, 2021.
Apple Inc. "Views on Rel-17 CSI enhancement"; 3GPP TSG RAN WG1 #105-e R1-2105091; 8 pages; May 27, 2021.
Office Action for CN 202180023003.5; May 7, 2025.
Qualcomm Inc "Further enhancements on CSI measurement and reporting" 3GPP TSG RAN WG1 #104e R1-2101452; Jan. 25, 2021.

* cited by examiner

| RI1 | RI2 |
|---|---|
| 1 | 1 |
| 1 | 2 |
| 1 | 3 |
| 1 | 4 |
| 2 | 1 |
| 2 | 2 |
| 2 | 3 |
| 2 | 4 |
| 3 | 1 |
| 3 | 2 |
| 3 | 3 |
| 3 | 4 |
| 4 | 1 |
| 4 | 2 |
| 4 | 3 |
| 4 | 4 |

FIG. 5A

| RI1 | RI2 |
|---|---|
| 1 | 1 |
| 1 | 2 |
| 2 | 1 |
| 2 | 2 |

FIG. 5B

METHODS FOR NON-PMI CSI REPORTING ENHANCEMENTS FOR MULTI-TRP OPERATION

PRIORITY CLAIM INFORMATION

This application is a national phase entry of PCT application number PCT/CN2021/120188, entitled "Methods for Non-PMI CSI Reporting Enhancements for Multi-TRP Operation," filed Sep. 24, 2021, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, and more particularly to systems, apparatuses, and methods for non-PMI CSI reporting enhancements for multiple transmission and reception points (multi-TRPs) operation, e.g., in a cellular communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the interne, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. In particular, it is important to ensure the robustness and accuracy of transmitted and received signals through user equipment (UE) devices, e.g., through wireless devices such as cellular phones, base stations and relay stations used in wireless cellular communications.

For example, multiple transmission and reception points (multi-TRPs) are evolving to improve reliability, coverage, and capacity performance through flexible deployment scenarios. For example, in order to support growth in mobile data traffic in 5G and enhance coverage, wireless devices are expected to access networks composed of multi-TRPs (e.g., macro-cells, small cells, pico-cells, femto-cells, remote radio heads, relay nodes, and so forth. However, various aspects of such a scheme remain under developed. Accordingly, improvements in the field are desired.

SUMMARY

Embodiments relate to wireless communications, and more particularly to apparatuses, systems, and methods for non-precoder matric index (PMI) channel state information (CSI) reporting enhancements for multiple transmission and reception points (multi-TRPs) operation, e.g., in a cellular communication system.

For example, in some embodiments, a user equipment device (UE) may be configured to receive, from a base station, a configuration for a first set of CSI reference signal (CSI-RS) resources for a first transmission and reception point (TRP), a second set of CSI-RS resources for a second TRP, and a third set of pairs of CSI-RS resources for the first TRP and second TRP. The first set of CSI-RS resources and the second set of CSI-RS resources may be associated with single TRP operation. The third set of pairs of CSI-RS resources may be associated with multi-TRP operation using the first TRP and the second TRP. Additionally, the UE may be configured to provide (e.g., report), to the base station, a CSI resource indicator (CRI) report indicating whether the UE prefers single TRP operation from the first TRP, single TRP operation from the second TRP, or multi-TRP operation from the first TRP and the second TRP. The CRI report may be based, at least in part, on the configuration.

As another example, a base station may be configured to transmit, to a UE, a configuration for a first set of CSI-RS resources for a first TRP, a second set of CSI-RS resources for a second TRP, and a third set of pairs of CSI-RS resources for the first TRP and second TRP. The configuration may be based, at least in part, on the maximum number of CSI-RS resources supported by the UE. The first set of CSI-RS resources and the second set of CSI-RS resources may be associated with single TRP operation. The third set of pairs of CSI-RS resources may be associated with multi-TRP operation using the first TRP and the second TRP. Additionally, the base station may be configured to receive, from the UE, a CRI report indicating whether the UE prefers single TRP operation from the first TRP, single TRP operation from the second TRP, or multi-TRP operation from the first TRP and the second TRP. The CRI report may be based, at least in part, on the configuration.

As a further example, a UE may be configured to report, to a base station, a maximum number of CSI-RS resources supported by the UE, e.g., via a UE capability. Additionally, the UE may be configured to receive, from the base station, a configuration for a first set of CSI-RS resources for a first TRP, a second set of CSI-RS resources for a second TRP, and a third set of pairs of CSI-RS resources for the first TRP and second TRP. The configuration may be based, at least in part, on the maximum number of CSI-RS resources supported by the UE. The first set of CSI-RS resources and the second set of CSI-RS resources may be associated with single TRP operation. The third set of pairs of CSI-RS resources may be associated with multi-TRP operation using the first TRP and the second TRP.

As an additional example, a base station may be configured to receive, from a UE, a maximum number of CSI-RS resources supported by the UE, e.g., via a UE capability. Additionally, the base station may be configured to transmit, to the UE, a configuration for a first set of CSI-RS resources for a first TRP, a second set of CSI-RS resources for a second TRP, and a third set of pairs of CSI-RS resources for the first TRP and second TRP. The configuration may be based, at least in part, on the maximum number of CSI-RS resources supported by the UE. The first set of CSI-RS resources and the second set of CSI-RS resources may be associated with single TRP operation. The third set of pairs of CSI-RS resources may be associated with multi-TRP operation using the first TRP and the second TRP.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIGS. 5A illustrates an example of RIs that are independently encoded and subject to maximum RI restrictions for each TRP, according to some embodiments.

FIGS. 5B illustrates an example of RIs that are jointly encoded and subject to both maximum RI restrictions for each TRP and maximum total combined RI restrictions, according to some embodiments.

Figure 1:
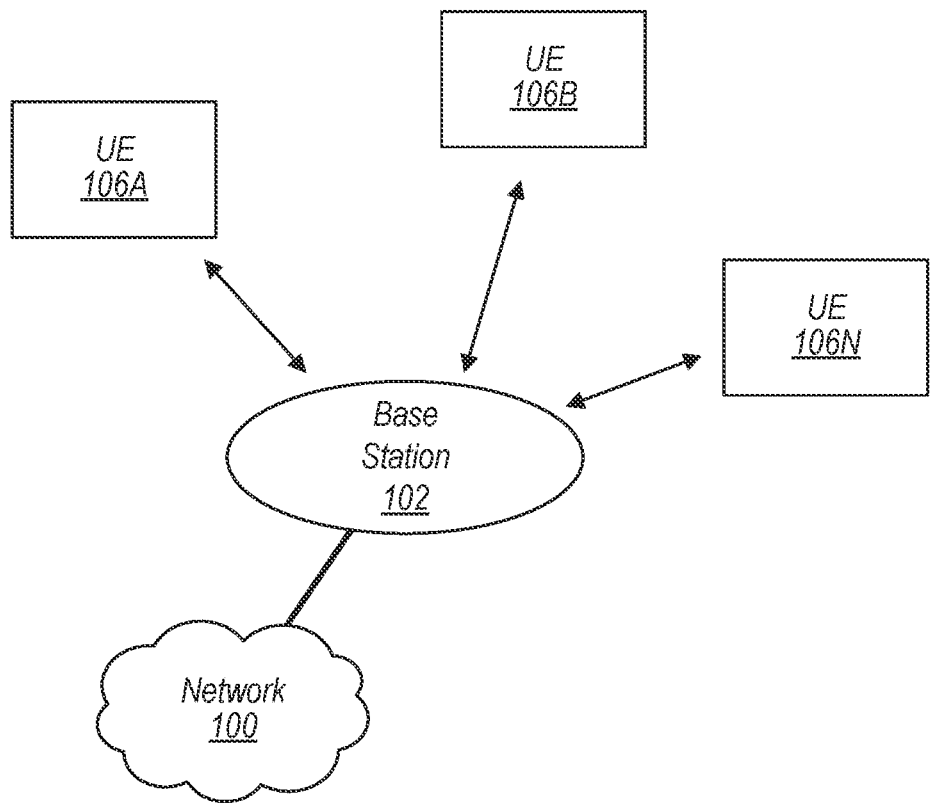
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC/5GCN: 5G Core Network
IE: Information Element
CE: Control Element
MAC: Medium Access Control
SSB: Synchronization Signal Block
CSI-RS: Channel State Information Reference Signal
PDCCH: Physical Downlink Control Channel
PDSCH: Physical Downlink Shared Channel
RRC: Radio Resource Control
RRM: Radio Resource Management
CORESET: Control Resource Set
TCI: Transmission Configuration Indicator
DCI: Downlink Control Indicator
TRP: Transmission and Reception Point
NC-JT: Non-coherent-Joint Transmission
FDMed: Frequency Division Multiplexed
TDMed: Time Division Multiplexed
SFN: Single Frequency Network
RSRP: Reference Signal Received Power
SINR: Signal-to-Interference-Plus Noise Ratio Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones, portable gaming devices, laptops, wearable devices (e.g., smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" (or WiFi) has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

3GPP Access—refers to accesses (e.g., radio access technologies) that are specified by 3GPP standards. These accesses include, but are not limited to, GSM/GPRS, LTE, LTE-A, and/or 5G NR. In general, 3GPP access refers to various types of cellular access technologies.

Non-3GPP Access—refers any accesses (e.g., radio access technologies) that are not specified by 3GPP standards. These accesses include, but are not limited to, WiMAX, CDMA2000, Wi-Fi, WLAN, and/or fixed networks. Non-3GPP accesses may be split into two categories, "trusted" and "untrusted": Trusted non-3GPP accesses can interact directly with an evolved packet core (EPC) and/or a 5G core (5GC) whereas untrusted non-3GPP accesses interwork with the EPC/5GC via a network entity, such as an Evolved Packet Data Gateway and/or a 5G NR gateway. In general, non-3GPP access refers to various types on non-cellular access technologies.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
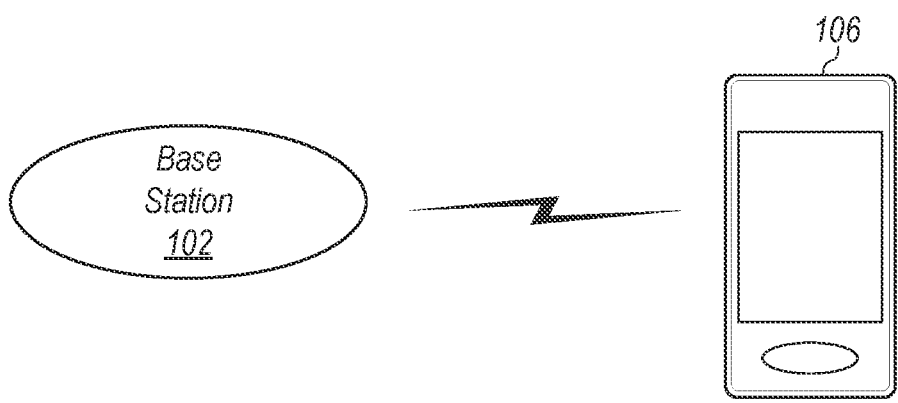
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5GNR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5GNR, 3GPP2 CDMA2000 (e.g., 1xRTT, 1xEV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. The UE 106 may also be configured to be camped on and communicate with multiple base stations concurrently. In some embodiments, the UE 106 may be configured to perform cross-cell beam failure recovery using a contention based random access procedure, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1xRTT (or LTE or NR, or LTE or GSM), and separate radios for communicating using each of Wi-Fi and BLUETOOTH. Other configurations are also possible.

Figure 3:
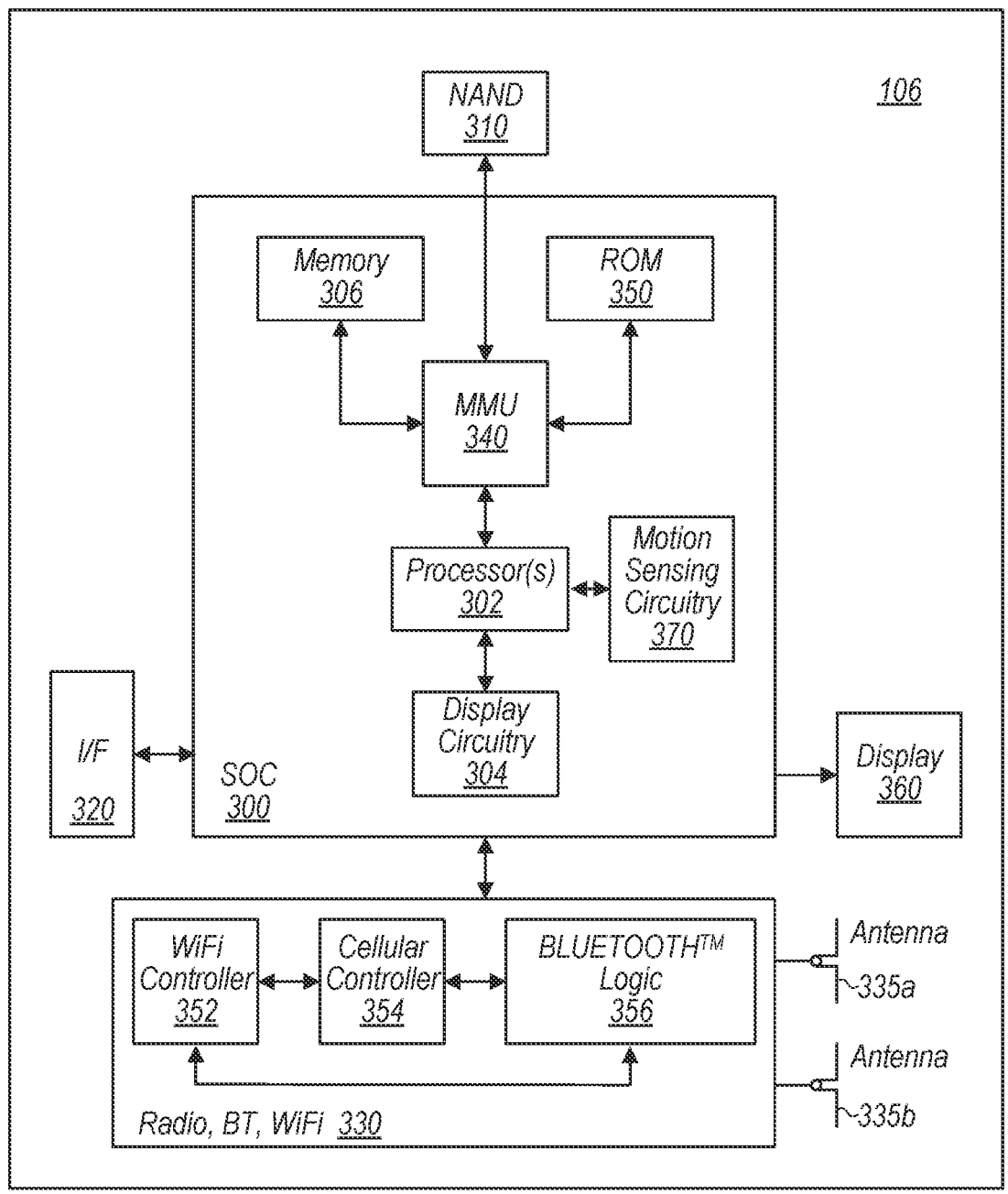
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash memory 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g., 335a), and possibly multiple antennas (e.g., illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform beam failure recovery using a contention based random access procedure such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform beam failure recovery using a contention based random access procedure according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g., LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments may have fewer or more similar controllers for various different RATs that may be implemented in UE device 106.

Figure 4:
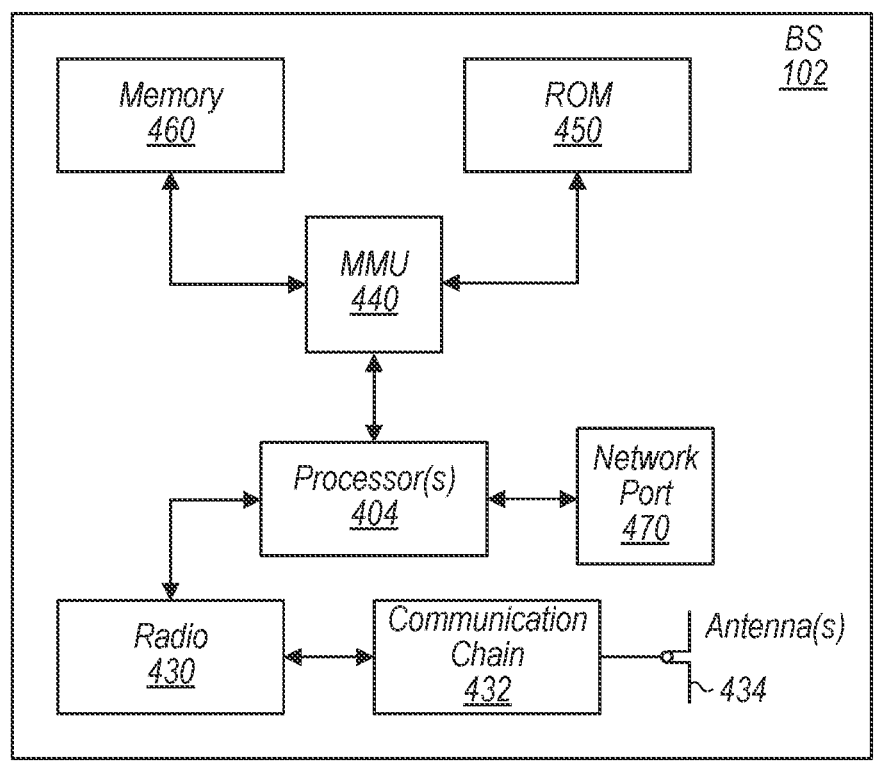
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof In the case of certain RATs, for example Wi-Fi, base station 102 may also be designed as an access point (AP), in which case network port 470 may be implemented to provide access to a wide area network and/or local area network (s), e.g., it may include at least one Ethernet port, and radio 430 may be designed to communicate according to the Wi-Fi standard. The base station 102 may operate according to the various methods as disclosed herein.

Non-PMI CSI Reporting Enhancements for Multi-TRP Operation

In current implementations of multi-TRP transmission schemes, a wireless device (e.g., a UE) may receive signals from different TRPs with the same or different UE antenna panels. In other words, the UE may receive signals either using a single antenna panel or using multiple (e.g., more than one) antenna panels. In some instances, if and/or when a signal is received from one UE antenna panel, up to a minimum (N_tx, N_rx) layers can be supported, where N_tx indicates a total number of transmission ports from two TRPs and where N_rx indicates a number of ports per antenna panel. In other words, a maximum number of layers that can be supported by the UE may be based on the lesser of a number of transmission ports from two TRPs and a number of ports per antenna panel. In other instances, if and/or when a signal is received from two UE antenna panels, up to a minimum of (N_tx, 2*N_rx) layers may be supported. In other words, a maximum number of layers that can be supported by the UE may be based on the lesser of a number of transmission ports from two TRPs and two times a number of ports per antenna panel.

Implementations of 3GPP Release 16 allows support of six TRP transmission schemes that are standardized:
(1) a multi-DCI based multi-TRP operation;
(2) a single-DCI based multi-TRP operation using spatial domain multiplexing (SDM) a single transport block (TB);
(3) a single-DCI based multi-TRP operation using frequency domain multiplexing (FDM) and a single TB;
(4) a single-DCI based multi-TRP operation using FDM and dual TBs;
(5) a single-DCI based multi-TRP operation using time domain multiplexing (TDM) with intra-slot repetition; and
(6) a single-DCI based multi-TRP operation using TDM with inter-slot repetition.

However, 3GPP Release 16 did not introduce any new Channel State Information Reference Signal (CSI-RS) processing procedures in support of multi-TRP operation. Thus, according to 3GPP Release 16, a UE is not allowed to perform explicit interference hypothetical testing to optimize a precoder for each TRP. Further, 3GPP Release 16 does not allow an efficient switch between single TRP and multi TRP operation.

In addition, in developments of 3GPP Release 17, one of the objectives of further MIMO enhancement has been to enhance CSI reporting for multi-TRP operation, especially for Non-Coherent Joint Transmission (NC-JT), e.g., when different layers are transmitted from different TRPs. However, to this point, no development regarding enhancement of non-PMI based CSI reporting for NC-JT in multi-TRP operation has been undertaken. Thus, current non-PMI based CSI reporting for NC-JT in multi-TRP operation is based on 3GPP Release 15 in which non-PMI CSI reporting is supported with reportQuantity set to "cri-RI-CQI" in CSI-ReportConfig. Additionally, 3GPP Release 15 specifies that at most 8 CSI-RS resources in a CSI-RS resource set for a CSI-ReportConfig, at most total 64 CSI-RS resources in resource setting for a CSI-ReportConfig, and at most 8 ports per CSI-RS resource. Note that CRI (CSI-RS indicator) indicates which CSI-RS resource a UE prefers, CQI is the channel quantity indicator, and RI indicates a number of layers (rank) preferred by the UE. Note further that when non-PMI-PortIndication is not configured, UE preferred CSI-RS ports are the first RI ports of the preferred CSI-RS resource and when non-PMI-PortIndication is configured, UE preferred CSI-RS ports are configured by radio resource control (RRC) signaling from the network in a PortIndexFor8Ranks parameter.

Additionally, in current implementations (e.g., 3GPP Release 17), the UE is required to support low latency cri-RI-CQI CSI feedback under certain conditions. In particular, Tables 5.4-1 and 5.4-2 of 3GPP TS 38.214 define CSI computation delay requirements in symbols for various bandwidths. Table 5.4-1 defines low latency requirements (e.g., $(Z_1, Z'_1)$) and Table 5.4-2 defines medium latency requirements (e.g., $(Z_1, Z'_1)$), high complexity reporting delay requirements (e.g., $(Z_2, Z'_2)$, and FR2 beam base reporting delay requirements (e.g., $(Z_3, Z'_3)$).

Embodiments described herein provide systems, methods, and mechanisms for enhancing non-PMI based CSI reporting for NC-JT in multi-TRP operations. In particular, embodiments described herein address channel state information (CSI) resource indicator (CRI) reporting, channel quality index (CQI) reporting, rank indicator (RI) reporting, and CSI processing complexity and timeline in NC-JT multi-TRP operations. For example, a network (e.g., a base station, such as base station 102) may configure three groups of CSI-RS resources. A first group of one or more CSI-RS resources and a second group of one or more CSI-RS resources may be associated with single TRP operations and a third group of one or more pairs of CSI-RS resources may be associated with multi-TRP operations. As another example, when the network configures a UE, such as UE 106, to report the UE's preferred operation under both single-TRP and multi-TRP operations and the network configures three groups of CSI-RS resources (e.g., two groups for single-TRP operations and a third group for multi-TRP operations), a bit-width of a CRI may be defined as $\log_2\lceil M1+M2+N\rceil$, where M1 is a number of CSI-RS resources configured for a first group of CSI-RS resources for single-TRP operation, M2 is a number of CSI-RS resources configured for a second group of CSI-RS resources for single-TRP operations, and N is a number of pairs of CSI-RS resources for a third group of CSI-RS resources for multi-TRP operations. Thus, the bit-width may be defined as the least integer that is greater than or equal to $\log_2(M1+M2+N)$ In some instances, a first M1 codepoints of CRI, e.g., 0, 1, . . . , M1-1, may indicate that the UE prefers single-TRP operation from the first TRP and corresponding preferred CSI-RS resource from the first TRP. Further, a next M2 codepoints of CRI, e.g., M1, M1+1, . . . , M1+M2-1, may indicate that the UE prefers single-TRP operation from the second TRP and corresponding preferred CSI-RS resource from the second TRP. Additionally, a next N codepoints of CRI, e.g., M1+M2, M1+M2+1, . . . , M1+M2+

N-1, may indicate that the UE prefers multi-TRP operation from both the first TRP and the second TRP as well as corresponding preferred CSI-RS resource pairs from both TRPs. Note that in at least some instances, an order of codepoint mapping could be different that the example described herein.

In some instances, various restrictions on a number of CSI-RS resources that may be configured by the network may be implemented. For example, a restriction on a number of CSI-RS resources may be per non zero power (NZP) CSI-RS resource set configured for a CSI-ReportConfig parameter. Thus, for example, a first group of CSI-RS resources (e.g., associated with single TRP operation as described above) may be limited to and/or capped at no more than four NZP-CSI-RS resources, a second group of CSI-RS resources (e.g., associated with single TRP operation as described above) may be limited to and/or capped at no more than four NZP-CSI-RS resources, and a third group of pairs of CSI-RS resources (e.g., associated with multi-TRP operation) may be limited to and/or capped at no more than four pairs of NZP-CSI-RS resources. Further, for example, the first group of CSI-RS resources may be limited to and/or capped at no more than eight NZP-CSI-RS resources, the second group of CSI-RS resources may be limited to and/or capped at no more than eight NZP-CSI-RS resources, and the third group of pairs of CSI-RS resources may be limited to and/or capped at no more than eight pairs of NZP-CSI-RS resources. As another example, a restriction on a number of CSI-RS resources may be over a total number of NZP-CSI-RS resources in all NZP-CSI-RS resource sets configured for a CSI-ReportConfig parameter. Thus, for example, a first group of CSI-RS resources (e.g., associated with single TRP operation as described above) may be limited to and/or capped at no more than sixty four NZP-CSI-RS resources per CSI-ReportConfig, a second group of CSI-RS resources (e.g., associated with single TRP operation as described above) may be limited to and/or capped at no more than sixty four NZP-CSI-RS resources per CSI-ReportConfig, and a third group of pairs of CSI-RS resources (e.g., associated with multi-TRP operation) may be limited to and/or capped at no more than sixty four pairs of NZP-CSI-RS resources per CSI-ReportConfig. Further, for example, the first group of CSI-RS resources may be limited to and/or capped at no more than thirty two NZP-CSI-RS resources per CSI-ReportConfig, the second group of CSI-RS resources may be limited to and/or capped at no more than thirty two NZP-CSI-RS resources per CSI-ReportConfig, and the third group of pairs of CSI-RS resources may be limited to and/or capped at no more than thirty two pairs of NZP-CSI-RS resources per CSI-ReportConfig. As a further example, a maximum number of NZP-CSI-RS resources may be reported as a UE capability. Thus, for example, the UE may report the maximum number of NZP-CSI-RS resources the UE supports to the base station, e.g., via RRC signaling, a MAC CE, and so forth.

In addition, when the network configures one or multiple pairs of CSI-RS resources for NC-JT multi-TRP operation, various antenna port restrictions may be considered. For example, within a pair of CSI-RS resources, both CSI-RS resources may be configured with a common number (e.g., same number) of antenna ports. As another example, all CSI-RS resources configured for NJ-TC multi-TRP operation may be configured with a common number of antenna ports. As a further example, all CSI-RS resources configured for NJ-TC multi-TRP operation and/or single-TRP operation may be configured with a common number of antenna ports.

Further, various antenna port limitations may be considered when the network configures one or multiple pairs of CSI-RS resources for NC-JT multi-TRP operation. For example, for single-TRP operation, each CSI-RS resource may not be configured with more than X1 ports, e.g., where X1 may be an integer between 1 and 8. As another example, for multi-TRP operation, each CSI-RS resource in a pair may not be configured with more than X2 ports, e.g., where X2 may be an integer between 1 and 8.

Additionally, with regards to CQI reporting, for single-TRP operation and/or multi-TRP operation, a single CQI may be reported when a combined rank of both TRPs is less than or equal to four. Further, with regards to CQI reporting, for single-TRP operation and/or multi-TRP operation, two CQIs may be reported when a combined rank of both TRPs is greater than four. In some instances, a combined rank of both TRPs may not exceed four, thus, only single CQI may be reported for multi-TRP operation.

In addition, with regards to RI reporting, for multi-TRP operation, the network may configure N pairs of CSI-RS resources. In such instances, two RIs may be reported for multi-TRP operation, each RI corresponding to one TRP, e.g., to one CSI-RS resource in the pair of CSI-RS resources. For example, each RI may be independently encoded and subject to maximum RI restrictions for each TRP, e.g., as illustrated by FIG. 5A. As shown, each RI (e.g., RI1 and RI2) are independently subject to a maximum RI of four. As another example, RIs may be jointly encoded and subject to both maximum RI restrictions for each TRP and maximum total combined RI restrictions, e.g., as illustrated by FIG. 5B. As shown, each RI (e.g., RI1 and RI2) are independently subject to a maximum RI of four and a total combined RI of four.

Further, with regards to RI reporting, when a non-PMI-PortIndication parameter is not configured and the base station configures a pair of CSI-RS resources, when the UE reports multiple RI for multi-TRP operation, the first RI may indicate first RI antenna ports in a first CSI-RS resource in the pair, e.g., $p_0^1, \ldots, p_{v1-1}^1$, and the second RI may indicate first RI antenna ports in a second CSI-RS resource in the pair, e.g., $p_0^2, \ldots, p_{v2-1}^2$. Note that v1 may be the first RI and $p_i^1$ may be the i+1 antenna port in the first CSI-RS resource in the pair and v2 may be the second RI and $p_i^2$ may be the i+1 antenna port in the second CSI-RS resource in the pair.

Additionally, with regards to RI reporting, when a non-PMI-PortIndication parameter is configured and the base station configures a pair of CSI-RS resources, when the UE reports multiple RI for multi-TRP operation, for each RI, which RI antenna ports are preferred from a corresponding CSI-RS resource may be configured by the base station via radio resource control (RRC) signaling. In some instances, RI antenna port mapping (e.g., to indicate for each RI, which RI antenna ports may be preferred) may be independently configured for each CSI-RS resource in each pair. In some instances, RI antenna port mapping may be equivalent (e.g., the same) for both CSI-RS resources in a pair but can be independently configured for different pairs of CSI-RS resources. In some instances, RI antenna port mapping may be equivalent (e.g., the same) for CSI-RS resources in all pairs of CSI-RS resources. As noted, RI antenna port mapping may indicate for each RI, which RI antenna ports may be preferred. For example, assuming four antenna port CSI-RS with antenna ports p0, p1, p2, and p3, RI antenna port mapping from the base station may include for RI=1:p2, for RI=2:p0, p3, for RI=3: p1, p2, p3, and for RI=4: p0, p1, p2, p3.

Further, with regards to CSI processing complexity and timeline requirements, an aperiodic CSI processing timeline may not consider low latency timing delay, e.g., as defined in Table 5.4-1 of 3GPP TS 38.214. Thus, for example, in some instances, an aperiodic CSI processing requirement may be based on a medium latency requirement (e.g., ($Z_1$, $Z'_1$)) as defined in Table 5.4-2 of 3GPP TS 3.214. As another example, in some instances, an aperiodic CSI processing requirement may be based on a high complexity reporting latency requirement (e.g., ($Z_2$, $Z'_2$) as defined in Table 5.4-2 of 3GPP TS 3.214. As a further example, in some instances, an aperiodic CSI processing requirement may be based on either of the medium latency requirement (e.g., ($Z_1$, $Z'_1$)) as or the high complexity reporting latency requirement (e.g., ($Z_2$, $Z'_2$)) as defined in Table 5.4-2 of 3GPP TS 3.214. In such instances, the lower latency (e.g., ($Z_1$, $Z'_1$)) may be used under certain conditions such as any, any combination of, and/or all of (e.g., one or more of) a maximum number of CSI-RS ports is limited, a maximum number of CSI-RS resources is limited, and/or single-TRP operation is not configured together with multi-TRP operation. In other instances, an aperiodic processing requirement may be reported as a UE capability.

Further, in some instances, with regards to CSI processing complexity and timeline requirements, the UE may report to the base station whether the UE supports non-PMI-PortIndication. Additionally, in some instances, the UE may report any, any combination of, and/or all of (e.g., one or more of) a maximum number of CSI-RS resources that may be configured for single-TRP operation, a maximum number of CSI-RS resources (pairs) that may be configured for multi-TRP operation, a total maximum number of CSI-RS resources that may be configured, a maximum number of CSI-RS antenna ports that may be configured for single-TRP operation, and/or a maximum number of CSI-RS ports that may be configured for multi-TRP operation.

FIGS. 6A, 6B, 7A, and 7B illustrate block diagrams of example of methods for non-PMI based SCI reporting for NC-JT multi-TRP transmission schemes, according to some embodiments. The methods shown in FIGS. 6A, 6B, 7A, and 7B may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, these methods may operate as follows.

Figure 6A:
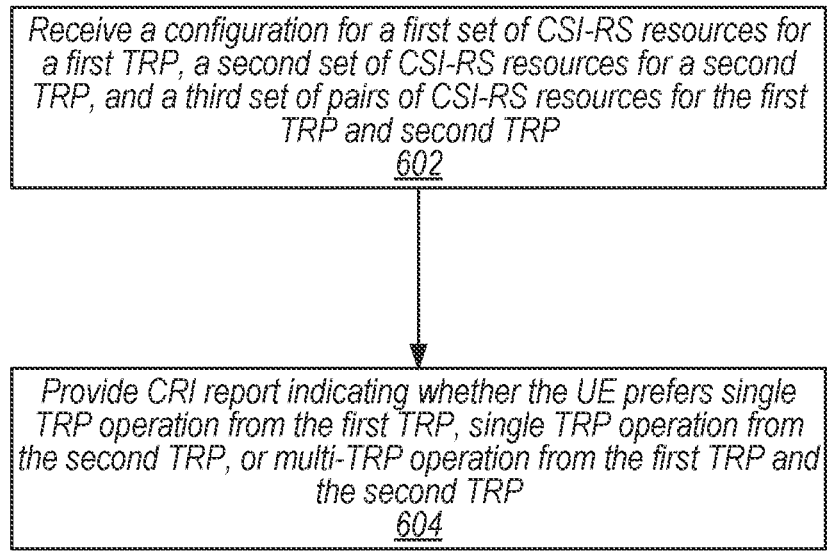
FIGS. 6A, 6B, 7A, and 7B illustrate block diagrams of example of methods for non-precoder matrix index (PMI) based channel state information (CSI) reporting for non-coherent-joint transmission (NC-JT) in multiple transmission and reception point, multi-TRP, transmission schemes, according to some embodiments.

Turning to FIG. 6A, at 602, a UE, such as UE 106, may receive, from a base station, such as base station 102, a configuration for a first set of CSI reference signal (CSI-RS) resources for a first transmission and reception point (TRP), a second set of CSI-RS resources for a second TRP, and a third set of pairs of CSI-RS resources for the first TRP and second TRP. The first set of CSI-RS resources and the second set of CSI-RS resources may be associated with single TRP operation. The third set of pairs of CSI-RS resources may be associated with multi-TRP operation using the first TRP and the second TRP.

At 604, the UE may provide (e.g., report), to the base station, a CSI resource indicator (CRI) report indicating whether the UE prefers single TRP operation from the first TRP, single TRP operation from the second TRP, or multi-TRP operation from the first TRP and the second TRP. The CRI report may be based, at least in part, on the configuration. In some instances, the CRI report may also indicate one or more of preferred CSI-RS resources from the first set of CSI-RS resources, preferred CSI-RS resources from the second set of CSI-RS resources, and/or preferred CSI-RS pairs from the third set of pairs of CSI-RS resources. In addition, a bit-width of the CRI report may be defined as a least integer greater than $\log_2(M1+M2+N)$, where M1 is a number of CSI-RS resources configured for the first set of CSI-RS resources, M2 is a number of CSI-RS resources configured for the second set of CSI-RS resources, and N is a number of pairs of CSI-RS resources configured for the third set of pairs of CSI-RS resources.

In some instances, a maximum number of CSI-RS resources per set may be less than or equal to a specified value. In such instances, the specified value may be four or eight. In some instances, a total number of CRI-RS resources across all sets may be less than or equal to a specified value. In such instances, the specified value may be four or eight.

In some instances, the UE may report, to the base station, a maximum number of CSI-RS resources supported by the UE. In some instances, the maximum number of CSI-RS resources supported by the UE may be reported as a UE capability.

In some instances, within a pair of CSI-RS resources within the third set of pairs of CSI-RS resources, CSI-RS resources may be configured with a same number of ports. In some instances, all CSI-RS resources within the third set of pairs of CSI-RS resources may be configured with a same number of ports. In some instances, all CSI-RS resources within the first set of CSI-RS resources, the second set of CSI-RS resources, and the third set of pairs of CSI-RS resources may be configured with a same number of ports.

In some instances, CSI-RS resources of the first set of CSI-RS resources and CSI-RS resources of the second set of CSI-RS resources may be limited to a specified number of ports. In such instances, the specified number of ports may be four or eight. In some instances, CSI-RS resource pairs of the third set of pairs of CSI-RS resources may be limited to a specified number of ports. In such instances, the specified number of ports may be four or eight.

In some instances, the UE may report, for multi-TRP operation when a combined rank of the first TRP and the second TRP is less than or equal to a specified number, a single channel quality index (CQI). Additionally, the UE may report, for multi-TRP operation when the combined rank of the first TRP and the second TRP is greater than the specified number, at least two CQIs. The specified number may be four or eight.

In some instances, the UE may report, for multi-TRP operation, a single channel quality index (CQI). In such instances, a combined rank of the first TRP and the second TRP may be limited to a specified rank. The specified rank may be four or eight.

In some instances, the UE may report, for multi-TRP operation, a rank indicator for the first TRP and a rank indicator for the second TRP. Note that reporting the rank indicator for the first TRP and the rank indicator for the second TRP may include the UE independently encoding the rank indicator for the first TRP and the rank indicator for the second TRP, at least in some instances. A rank of the first TRP and a rank for the second TRP may each be limited to a specified rank. The specified rank may be four or eight. Additionally, the rank indicator for the first TRP may indicate preferred ports in a first CSI-RS resource of a CSI-RS resource pair and the rank indicator for the second TRP may indicate preferred ports in a second CSI-RS resource of the CSI-RS resource pair. Further, when non-PMI-PortIndication is configured by the base station, preferred ports of a CSI-RS resource may be configured by the base station via radio resource control signaling. In addition, RI to CSI-RS port mapping may be configured per CSI-RS resource in a CSI-RS resource pair, per CSI-RS resource pair, or per set of pairs of CSI-RS resource pairs.

In some instances, reporting the rank indicator for the first TRP and the rank indicator for the second TRP may include the UE jointly encoding the rank indicator for the first TRP and the rank indicator for the second TRP. A rank of the first TRP, a rank for the second TRP, and a combined rank of the first TRP and the second TRP may each be limited to a specified rank. The specified rank may be four or eight.

In some instances, an aperiodic CSI processing timing requirement may be based on at least one of $(Z_1, Z'_1)$ as defined in Table 5.4-2 of 3GPP TS 3.214, $(Z_2, Z'_2)$ as defined in Table 5.4-2 of 3GPP TS 3.214, or $(Z_1, Z'_2)$ or $(Z_1, Z'_2)$. Note that when the aperiodic CSI processing timing requirement is based on $(Z_1, Z'_1)$ or $(Z_2, Z'_2)$, $(Z_1, Z'_1)$ may be used when one or more of a maximum number of CSI-RS ports is limited, a maximum number of CSI-RS resources is limited, and/or single-TRP operation is not configured together with multi-TRP operation.

In some instances, an aperiodic processing requirement may be reported by the UE to the base station as a UE capability.

In some instances, the UE may report, to the base station, whether the UE supports non-PMI-PortIndication configuration as a UE capability.

In some instances, the UE may report, to the base station, one or more of a maximum number of CSI-RS resources that can be configured for single-TRP operation, a maximum number of CSI-RS resource pairs that can be configured for multi-TRP operation, a total number of CSI-RS resources that can be configured, a number of CSI-RS ports that can be configured for single-TRP operation, and/or a number of CSI-RS ports that can be configured for multi-TRP operation.

Figure 6B:
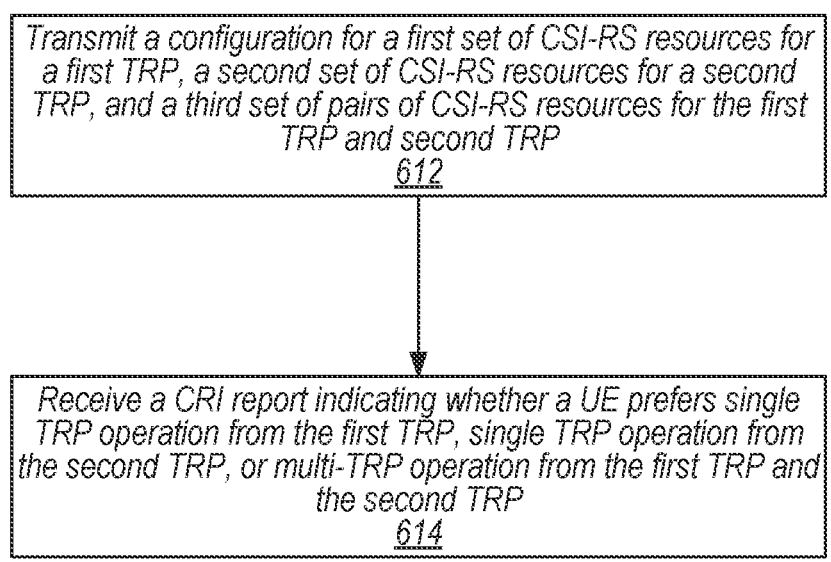

Turning to FIG. 6B, at 612, a base station, such as base station 102, may transmit, to a UE, such as UE 106, a configuration for a first set of CSI reference signal (CSI-RS) resources for a first transmission and reception point (TRP), a second set of CSI-RS resources for a second TRP, and a third set of pairs of CSI-RS resources for the first TRP and second TRP. The first set of CSI-RS resources and the second set of CSI-RS resources may be associated with single TRP operation. The third set of pairs of CSI-RS resources may be associated with multi-TRP operation using the first TRP and the second TRP.

At 614, the base station may receive, from the UE, a CSI resource indicator (CRI) report indicating whether the UE prefers single TRP operation from the first TRP, single TRP operation from the second TRP, or multi-TRP operation from the first TRP and the second TRP. The CRI report may be based, at least in part, on the configuration. In some instances, the CRI report may also indicate one or more of preferred CSI-RS resources from the first set of CSI-RS resources, preferred CSI-RS resources from the second set of CSI-RS resources, and/or preferred CSI-RS pairs from the third set of pairs of CSI-RS resources. In addition, a bitwidth of the CRI report may be defined as a least integer greater than $\log_2(M1+M2+N)$, where M1 is a number of CSI-RS resources configured for the first set of CSI-RS resources, M2 is a number of CSI-RS resources configured for the second set of CSI-RS resources, and N is a number of pairs of CSI-RS resources configured for the third set of pairs of CSI-RS resources.

In some instances, a maximum number of CSI-RS resources per set may be less than or equal to a specified value. In such instances, the specified value may be four or eight. In some instances, a total number of CRI-RS resources across all sets may be less than or equal to a specified value. In such instances, the specified value may be four or eight.

In some instances, the base station may receive, from the UE, a maximum number of CSI-RS resources supported by the UE. In some instances, the maximum number of CSI-RS resources supported by the UE may be reported as a UE capability.

In some instances, within a pair of CSI-RS resources within the third set of pairs of CSI-RS resources, CSI-RS resources may be configured with a same number of ports. In some instances, all CSI-RS resources within the third set of pairs of CSI-RS resources may be configured with a same number of ports. In some instances, all CSI-RS resources within the first set of CSI-RS resources, the second set of CSI-RS resources, and the third set of pairs of CSI-RS resources may be configured with a same number of ports.

In some instances, CSI-RS resources of the first set of CSI-RS resources and CSI-RS resources of the second set of CSI-RS resources may be limited to a specified number of ports. In such instances, the specified number of ports may be four or eight. In some instances, CSI-RS resource pairs of the third set of pairs of CSI-RS resources may be limited to a specified number of ports. In such instances, the specified number of ports may be four or eight.

In some instances, the base station may receive, from the UE, for multi-TRP operation when a combined rank of the first TRP and the second TRP is less than or equal to a specified number, a single channel quality index (CQI). Additionally, the base station may receive, from the UE, for multi-TRP operation when the combined rank of the first TRP and the second TRP is greater than the specified number, at least two CQIs. The specified number may be four or eight.

In some instances, the base station may receive, from the UE, for multi-TRP operation, a single channel quality index (CQI). In such instances, a combined rank of the first TRP and the second TRP may be limited to a specified rank. The specified rank may be four or eight.

In some instances, the base station may receive, from the UE, for multi-TRP operation, a rank indicator for the first TRP and a rank indicator for the second TRP. Note that reporting the rank indicator for the first TRP and the rank indicator for the second TRP may include the UE independently encoding the rank indicator for the first TRP and the rank indicator for the second TRP, at least in some instances. A rank of the first TRP and a rank for the second TRP may each be limited to a specified rank. The specified rank may be four or eight. Additionally, the rank indicator for the first TRP may indicate preferred ports in a first CSI-RS resource of a CSI-RS resource pair and the rank indicator for the second TRP may indicate preferred ports in a second CSI-RS resource of the CSI-RS resource pair. Further, when non-PMI-PortIndication is configured by the base station, preferred ports of a CSI-RS resource may be configured by the base station via radio resource control signaling. In addition, RI to CSI-RS port mapping may be configured per CSI-RS resource in a CSI-RS resource pair, per CSI-RS resource pair, or per set of pairs of CSI-RS resource pairs.

In some instances, reporting the rank indicator for the first TRP and the rank indicator for the second TRP may include the UE jointly encoding the rank indicator for the first TRP and the rank indicator for the second TRP. A rank of the first TRP, a rank for the second TRP, and a combined rank of the first TRP and the second TRP may each be limited to a specified rank. The specified rank may be four or eight.

In some instances, an aperiodic CSI processing timing requirement may be based on at least one of $(Z_1, Z'_1)$ as defined in Table 5.4-2 of 3GPP TS 3.214, $(Z_2, Z'_2)$ as defined in Table 5.4-2 of 3GPP TS 3.214, or $(Z_1, Z'_1)$ or $(Z_2, Z'_2)$. Note that when the aperiodic CSI processing timing requirement is based on $(Z_1, Z'_1)$ or $(Z_2, Z'_2)$, $(Z_1, Z'_1)$ may be used when one or more of a maximum number of CSI-RS ports is limited, a maximum number of CSI-RS resources is limited, and/or single-TRP operation is not configured together with multi-TRP operation.

In some instances, an aperiodic processing requirement may be reported by the UE to the base station as a UE capability.

In some instances, the base station may receive, from the UE, an indication of whether the UE supports non-PMI-PortIndication configuration as a UE capability.

In some instances, the base station may receive, from the UE, one or more of a maximum number of CSI-RS resources that can be configured for single-TRP operation, a maximum number of CSI-RS resource pairs that can be configured for multi-TRP operation, a total number of CSI-RS resources that can be configured, a number of CSI-RS ports that can be configured for single-TRP operation, and/or a number of CSI-RS ports that can be configured for multi-TRP operation.

Figure 7A:
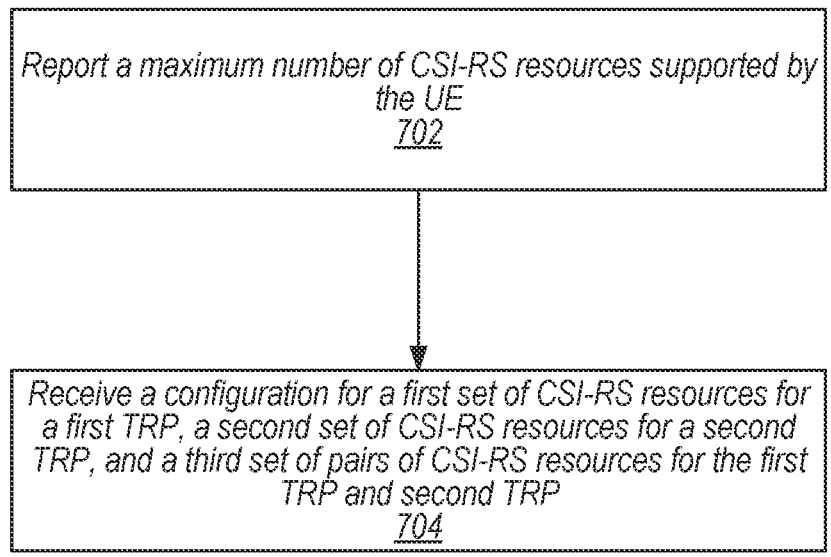

Turning to FIG. 7A, at 702, a UE, such as UE 106, UE may report, to the base station, such as base station 102, a maximum number of CSI-RS resources supported by the UE. In some instances, the maximum number of CSI-RS resources supported by the UE may be reported as a UE capability.

At 704, the UE may receive, from the base station, a configuration for a first set of CSI reference signal (CSI-RS) resources for a first transmission and reception point (TRP), a second set of CSI-RS resources for a second TRP, and a third set of pairs of CSI-RS resources for the first TRP and second TRP. The configuration may be based, at least in part, on the maximum number of CSI-RS resources supported by the UE. The first set of CSI-RS resources and the second set of CSI-RS resources may be associated with single TRP operation. The third set of pairs of CSI-RS resources may be associated with multi-TRP operation using the first TRP and the second TRP.

In some instances, the UE may provide (e.g., report), to the base station, a CSI resource indicator (CRI) report indicating whether the UE prefers single TRP operation from the first TRP, single TRP operation from the second TRP, or multi-TRP operation from the first TRP and the second TRP. The CRI report may be based, at least in part, on the configuration. In some instances, the CRI report may also indicate one or more of preferred CSI-RS resources from the first set of CSI-RS resources, preferred CSI-RS resources from the second set of CSI-RS resources, and/or preferred CSI-RS pairs from the third set of pairs of CSI-RS resources.

In addition, a bit-width of the CRI report may be defined as a least integer greater than $\log_2(M1+M2+N)$, where M1 is a number of CSI-RS resources configured for the first set of CSI-RS resources, M2 is a number of CSI-RS resources configured for the second set of CSI-RS resources, and N is a number of pairs of CSI-RS resources configured for the third set of pairs of CSI-RS resources.

In some instances, a maximum number of CSI-RS resources per set may be less than or equal to a specified value. In such instances, the specified value may be four or eight. In some instances, a total number of CRI-RS resources across all sets may be less than or equal to a specified value. In such instances, the specified value may be four or eight.

In some instances, within a pair of CSI-RS resources within the third set of pairs of
CSI-RS resources, CSI-RS resources may be configured with a same number of ports. In some instances, all CSI-RS resources within the third set of pairs of CSI-RS resources may be configured with a same number of ports. In some instances, all CSI-RS resources within the first set of CSI-RS resources, the second set of CSI-RS resources, and the third set of pairs of CSI-RS resources may be configured with a same number of ports.

In some instances, CSI-RS resources of the first set of CSI-RS resources and CSI-RS resources of the second set of CSI-RS resources may be limited to a specified number of ports. In such instances, the specified number of ports may be four or eight. In some instances, CSI-RS resource pairs of the third set of pairs of CSI-RS resources may be limited to a specified number of ports. In such instances, the specified number of ports may be four or eight.

In some instances, the UE may report, for multi-TRP operation when a combined rank of the first TRP and the second TRP is less than or equal to a specified number, a single channel quality index (CQI). Additionally, the UE may report, for multi-TRP operation when the combined rank of the first TRP and the second TRP is greater than the specified number, at least two CQIs. The specified number may be four or eight.

In some instances, the UE may report, for multi-TRP operation, a single channel quality index (CQI). In such instances, a combined rank of the first TRP and the second TRP may be limited to a specified rank. The specified rank may be four or eight.

In some instances, the UE may report, for multi-TRP operation, a rank indicator for the first TRP and a rank indicator for the second TRP. Note that reporting the rank indicator for the first TRP and the rank indicator for the second TRP may include the UE independently encoding the rank indicator for the first TRP and the rank indicator for the second TRP, at least in some instances. A rank of the first TRP and a rank for the second TRP may each be limited to a specified rank. The specified rank may be four or eight. Additionally, the rank indicator for the first TRP may indicate preferred ports in a first CSI-RS resource of a CSI-RS resource pair and the rank indicator for the second TRP may indicate preferred ports in a second CSI-RS resource of the CSI-RS resource pair. Further, when non-PMI-PortIndication is configured by the base station, preferred ports of a CSI-RS resource may be configured by the base station via radio resource control signaling. In addition, RI to CSI-RS port mapping may be configured per CSI-RS resource in a CSI-RS resource pair, per CSI-RS resource pair, or per set of pairs of CSI-RS resource pairs.

In some instances, reporting the rank indicator for the first TRP and the rank indicator for the second TRP may include the UE jointly encoding the rank indicator for the first TRP and the rank indicator for the second TRP. A rank of the first TRP, a rank for the second TRP, and a combined rank of the first TRP and the second TRP may each be limited to a specified rank. The specified rank may be four or eight.

In some instances, an aperiodic CSI processing timing requirement may be based on at least one of $(Z_1, Z'_1)$ as defined in Table 5.4-2 of 3GPP TS 3.214, $(Z_2, Z'_2)$ as defined in Table 5.4-2 of 3GPP TS 3.214, or $(Z_1, Z'_1)$ or $(Z_2, Z'_2)$.

Note that when the aperiodic CSI processing timing requirement is based on $(Z_1, Z'_1)$ or $(Z_2, Z'_2)$, $(Z_1, Z'_1)$ may be used when one or more of a maximum number of CSI-RS ports is limited, a maximum number of CSI-RS resources is limited, and/or single-TRP operation is not configured together with multi-TRP operation.

In some instances, an aperiodic processing requirement may be reported by the UE to the base station as a UE capability.

In some instances, the UE may report, to the base station, whether the UE supports non-PMI-PortIndication configuration as a UE capability.

In some instances, the UE may report, to the base station, one or more of a maximum number of CSI-RS resources that can be configured for single-TRP operation, a maximum number of CSI-RS resource pairs that can be configured for multi-TRP operation, a total number of CSI-RS resources that can be configured, a number of CSI-RS ports that can be configured for single-TRP operation, and/or a number of CSI-RS ports that can be configured for multi-TRP operation.

Figure 7B:
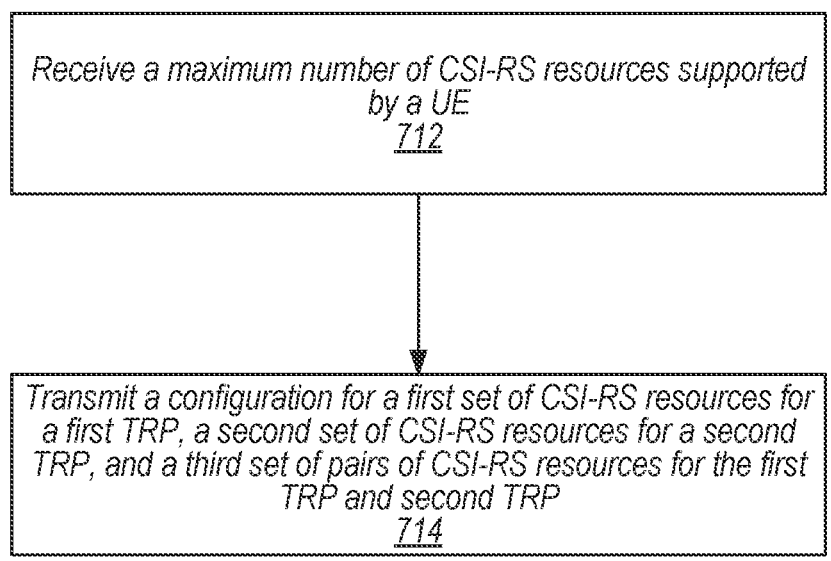

Turning to FIG. 7B, at 712, a base station, such as base station 102, may receive, from a UE, such as UE 106, a maximum number of CSI-RS resources supported by the UE. In some instances, the maximum number of CSI-RS resources supported by the UE may be reported as a UE capability.

At 714, the base station may transmit, to the UE, a configuration for a first set of CSI reference signal (CSI-RS) resources for a first transmission and reception point (TRP), a second set of CSI-RS resources for a second TRP, and a third set of pairs of CSI-RS resources for the first TRP and second TRP. The configuration may be based, at least in part, on the maximum number of CSI-RS resources supported by the UE. The first set of CSI-RS resources and the second set of CSI-RS resources may be associated with single TRP operation. The third set of pairs of CSI-RS resources may be associated with multi-TRP operation using the first TRP and the second TRP.

In some instances, the base station may receive, from the UE, a CSI resource indicator (CRI) report indicating whether the UE prefers single TRP operation from the first TRP, single TRP operation from the second TRP, or multi-TRP operation from the first TRP and the second TRP. The CRI report may be based, at least in part, on the configuration. In some instances, the CRI report may also indicate one or more of preferred CSI-RS resources from the first set of CSI-RS resources, preferred CSI-RS resources from the second set of CSI-RS resources, and/or preferred CSI-RS pairs from the third set of pairs of CSI-RS resources. In addition, a bit-width of the CRI report may be defined as a least integer greater than $\log_2(M1+M2+N)$, where M1 is a number of CSI-RS resources configured for the first set of CSI-RS resources, M2 is a number of CSI-RS resources configured for the second set of CSI-RS resources, and N is a number of pairs of CSI-RS resources configured for the third set of pairs of CSI-RS resources.

In some instances, a maximum number of CSI-RS resources per set may be less than or equal to a specified value. In such instances, the specified value may be four or eight. In some instances, a total number of CRI-RS resources across all sets may be less than or equal to a specified value. In such instances, the specified value may be four or eight.

In some instances, within a pair of CSI-RS resources within the third set of pairs of CSI-RS resources, CSI-RS resources may be configured with a same number of ports.

In some instances, all CSI-RS resources within the third set of pairs of CSI-RS resources may be configured with a same number of ports. In some instances, all CSI-RS resources within the first set of CSI-RS resources, the second set of CSI-RS resources, and the third set of pairs of CSI-RS resources may be configured with a same number of ports.

In some instances, CSI-RS resources of the first set of CSI-RS resources and CSI-RS resources of the second set of CSI-RS resources may be limited to a specified number of ports. In such instances, the specified number of ports may be four or eight. In some instances, CSI-RS resource pairs of the third set of pairs of CSI-RS resources may be limited to a specified number of ports. In such instances, the specified number of ports may be four or eight.

In some instances, the base station may receive, from the UE, for multi-TRP operation when a combined rank of the first TRP and the second TRP is less than or equal to a specified number, a single channel quality index (CQI). Additionally, the base station may receive, from the UE, for multi-TRP operation when the combined rank of the first TRP and the second TRP is greater than the specified number, at least two CQIs. The specified number may be four or eight.

In some instances, the base station may receive, from the UE, for multi-TRP operation, a single channel quality index (CQI). In such instances, a combined rank of the first TRP and the second TRP may be limited to a specified rank. The specified rank may be four or eight.

In some instances, the base station may receive, from the UE, for multi-TRP operation, a rank indicator for the first TRP and a rank indicator for the second TRP. Note that reporting the rank indicator for the first TRP and the rank indicator for the second TRP may include the UE independently encoding the rank indicator for the first TRP and the rank indicator for the second TRP, at least in some instances. A rank of the first TRP and a rank for the second TRP may each be limited to a specified rank. The specified rank may be four or eight. Additionally, the rank indicator for the first TRP may indicate preferred ports in a first CSI-RS resource of a CSI-RS resource pair and the rank indicator for the second TRP may indicate preferred ports in a second CSI-RS resource of the CSI-RS resource pair. Further, when non-PMI-PortIndication is configured by the base station, preferred ports of a CSI-RS resource may be configured by the base station via radio resource control signaling. In addition, RI to CSI-RS port mapping may be configured per CSI-RS resource in a CSI-RS resource pair, per CSI-RS resource pair, or per set of pairs of CSI-RS resource pairs.

In some instances, reporting the rank indicator for the first TRP and the rank indicator for the second TRP may include the UE jointly encoding the rank indicator for the first TRP and the rank indicator for the second TRP. A rank of the first TRP, a rank for the second TRP, and a combined rank of the first TRP and the second TRP may each be limited to a specified rank. The specified rank may be four or eight.

In some instances, an aperiodic CSI processing timing requirement may be based on at least one of $(Z_1, Z'_1)$ as defined in Table 5.4-2 of 3GPP TS 3.214, $(Z_2, Z'_2)$ as defined in Table 5.4-2 of 3GPP TS 3.214, or $(Z_1, Z'_1)$ or $(Z_2, Z'_2)$. Note that when the aperiodic CSI processing timing requirement is based on $(Z_1, Z'_1)$ or $(Z_2, Z'_2)$, $(Z_1, Z'_1)$ may be used when one or more of a maximum number of CSI-RS ports is limited, a maximum number of CSI-RS resources is limited, and/or single-TRP operation is not configured together with multi-TRP operation.

In some instances, an aperiodic processing requirement may be reported by the UE to the base station as a UE capability.

In some instances, the base station may receive, from the UE, an indication of whether the UE supports non-PMI-PortIndication configuration as a UE capability.

In some instances, the base station may receive, from the UE, one or more of a maximum number of CSI-RS resources that can be configured for single-TRP operation, a maximum number of CSI-RS resource pairs that can be configured for multi-TRP operation, a total number of CSI-RS resources that can be configured, a number of CSI-RS ports that can be configured for single-TRP operation, and/or a number of CSI-RS ports that can be configured for multi-TRP operation.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for non-precoder matrix index (PMI) based channel state information (CSI) reporting for non-coherent-joint transmission (NC-JT) in multiple transmission and reception point, multi-TRP, transmission schemes, the method comprising:
a user equipment device (UE),
reporting, to a base station, an aperiodic processing requirement as a UE capability;
receiving, from the base station, a configuration for a first set of CSI reference signal (CSI-RS) resources for a first transmission and reception point (TRP), a second set of CSI-RS resources for a second TRP, and a third set of pairs of CSI-RS resources for the first TRP and second TRP, wherein the first set of CSI-RS resources and the second set of CSI-RS resources are associated with single TRP operation, and wherein the third set of pairs of CSI-RS resources are associated with multi-TRP operation using the first TRP and the second TRP; and
providing, to the base station, a CSI resource indicator (CRI) report indicating whether the UE prefers single TRP operation from the first TRP, single TRP operation from the second TRP, or multi-TRP operation from the first TRP and the second TRP; and
reporting, to the base station, for multi-TRP operation:
a single channel quality index (CQI) when a combined rank of the first TRP and the second TRP is less than or equal to a specified number or when the combined rank of the first TRP and the second TRP is limited to a specified rank; or
at least two CQIs when the combined rank of the first TRP and the second TRP is greater than the specified number.

2. The method of claim 1, further comprising:
the UE,
reporting, to the base station, a maximum number of CSI-RS resources supported by the UE via a UE capability.

3. The method of claim 1, further comprising:
the UE,
independently encoding a rank indicator for the first TRP and a rank indicator for the second TRP; and
reporting, for multi-TRP operation, the rank indicator for the first TRP and the rank indicator for the second TRP.

4. The method of claim 3,
wherein a rank of the first TRP and a rank of the second TRP are each limited to a specified rank or wherein a rank of the first TRP, a rank for the second TRP, and a combined rank of the first TRP and the second TRP are each limited to a specified rank.

5. The method of claim 3,
wherein the rank indicator for the first TRP indicates preferred ports in a first CSI-RS resource of a CSI-RS resource pair and the rank indicator for the second TRP indicates preferred ports in a second CSI-RS resource of the CSI-RS resource pair;
wherein, when non-PMI-PortIndication is configured by the base station, preferred ports of a CSI-RS resource are configured by the base station via radio resource control signaling; and
wherein a rank indicator to CSI-RS port mapping is configured per CSI-RS resource in a CSI-RS resource pair, per CSI-RS resource pair, or per set of pairs of CSI-RS resource pairs.

6. The method of claim 1, further comprising:
the UE,
reporting, to the base station, whether the UE supports non-PMI-PortIndication configuration as a UE capability.

7. The method of claim 1, further comprising:
the UE,
reporting, to the base station, one or more of:
a maximum number of CSI-RS resources that can be configured for single-TRP operation;
a maximum number of CSI-RS resource pairs that can be configured for multi-TRP operation;
a total number of CSI-RS resources that can be configured;
a number of CSI-RS ports that can be configured for single-TRP operation; or
a number of CSI-RS ports that can be configured for multi-TRP operation.

8. A base station configured to perform wireless communication with a user equipment device (UE), the base station comprising:
a radio; and
a processing element operatively coupled to the radio;
wherein the processing element is configured to cause the base station to:
receive, from the UE, an aperiodic processing requirement as a UE capability;
transmit, to the UE, a configuration for a first set of channel state information (CSI) reference signal (CSI-RS) resources for a first transmission and reception point (TRP), a second set of CSI-RS resources for a second TRP, and a third set of pairs of CSI-RS resources for the first TRP and second TRP, wherein the first set of CSI-RS resources and the second set of CSI-RS resources are associated with single TRP operation, and wherein the third set of pairs of CSI-RS resources are associated with multi-TRP operation using the first TRP and the second TRP; and
receiving, from the UE, a CSI resource indicator (CRI) report indicating whether the UE prefers single TRP operation from the first TRP, single TRP operation from the second TRP, or multi-TRP operation from the first TRP and the second TRP; and
receiving, from the UE, for multi-TRP operation:
a single channel quality index (CQI) when a combined rank of the first TRP and the second TRP is less than or equal to a specified number or when the combined rank of the first TRP and the second TRP is limited to a specified rank; or
at least two CQIs when the combined rank of the first TRP and the second TRP is greater than the specified number.

9. The base station of claim 8,
wherein the CRI report further indicates one or more of preferred CSI-RS resources from the first set of CSI-RS resources, preferred CSI-RS resources from the second set of CSI-RS resources, or preferred CSI-RS pairs from the third set of pairs of CSI-RS resources.

10. The base station of claim 8,
wherein a bit-width of the CRI report is defined as a least integer greater than $\log_2(M1+M2+N)$, wherein M1 is a number of CSI-RS resources configured for the first set of CSI-RS resources, M2 is a number of CSI-RS resources configured for the second set of CSI-RS resources, and N is a number of pairs of CSI-RS resources configured for the third set of pairs of CSI-RS resources.

11. The base station of claim 8,
wherein a maximum number of CSI-RS resources per set is less than or equal to a specified value, and wherein the specified value is at least one of four or eight; and
wherein a total number of CRI-RS resources across all sets is less than or equal to a specified value, and wherein the specified value is at least one of thirty two or sixty four.

12. The base station of claim 8,
wherein CSI-RS resources are configured with a same number of ports within a pair of CSI-RS resources within the third set of pairs of CSI-RS resources, for all CSI-RS resources within the third set of pairs of CSI-RS resources, or for all CSI-RS resources within the first set of CSI-RS resources, the second set of CSI-RS resources, and the third set of pairs of CSI-RS resources.

13. The base station of claim 8,
wherein CSI-RS resources of the first set of CSI-RS resources and CSI-RS resources of the second set of CSI-RS resources are limited to a specified number of ports; or
wherein CSI-RS resource pairs of the third set of pairs of CSI-RS resources are limited to a specified number of ports.

14. An apparatus, comprising:
a memory; and
at least one processor in communication with the memory, wherein the at least one processor is configured to:
receive, from a user equipment device (UE), an aperiodic processing requirement as a UE capability;
transmit, to the UE, a configuration for a first set of channel state information (CSI) reference signal (CSI-RS) resources for a first transmission and reception point (TRP), a second set of CSI-RS resources for a second TRP, and a third set of pairs of CSI-RS resources for the first TRP and second TRP, wherein the first set of CSI-RS resources and the second set of CSI-RS resources are associated with single TRP operation, and wherein the third set of pairs of CSI-RS resources are associated with multi-TRP operation using the first TRP and the second TRP; and
receiving, from the UE, a CSI resource indicator (CRI) report indicating whether the UE prefers single TRP operation from the first TRP, single TRP operation from the second TRP, or multi-TRP operation from the first TRP and the second TRP; and
receiving, from the UE, for multi-TRP operation:
a single channel quality index (CQI) when a combined rank of the first TRP and the second TRP is less than or equal to a specified number or when the combined rank of the first TRP and the second TRP is limited to a specified rank; or
at least two CQIs when the combined rank of the first TRP and the second TRP is greater than the specified number.

15. The apparatus of claim 14,
wherein the CRI report further indicates one or more of preferred CSI-RS resources from the first set of CSI-RS resources, preferred CSI-RS resources from the second set of CSI-RS resources, or preferred CSI-RS pairs from the third set of pairs of CSI-RS resources.

16. The apparatus of claim 14,
wherein a maximum number of CSI-RS resources per set is less than or equal to a specified value, and wherein the specified value is at least one of four or eight; and
wherein a total number of CRI-RS resources across all sets is less than or equal to a specified value, and wherein the specified value is at least one of thirty two or sixty four.

17. The apparatus of claim 14,
wherein CSI-RS resources of the first set of CSI-RS resources and CSI-RS resources of the second set of CSI-RS resources are limited to a specified number of ports; or
wherein CSI-RS resource pairs of the third set of pairs of CSI-RS resources are limited to a specified number of ports.

18. The method of claim 1, further comprising:
the UE,
reporting, to the base station, whether the UE supports non-PMI-PortIndication configuration as a UE capability.

19. The base station of claim 8,
wherein the processing element is configured to cause the base station to:
receive, from the UE, a UE capability indicating whether the UE supports non-PMI-PortIndication configuration.

20. The apparatus of claim 14,
wherein the at least one processor is further configured to:
receive, from the UE, a UE capability indicating whether the UE supports non-PMI-PortIndication configuration.

\* \* \* \* \*